(12) United States Patent
Chen et al.

(10) Patent No.: US 7,352,928 B2
(45) Date of Patent: Apr. 1, 2008

(54) TUNABLE OPTICAL ADD/DROP MULTIPLEXER

(75) Inventors: Bo Chen, Shenzhen (CN); Bo Cai, London (GB); Yatao Yang, Plano, TX (US); Ming Liang, Shenzhen (CN); Xiaobiao Wang, Shenzhen (CN)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/693,962

(22) Filed: Mar. 30, 2007

(65) Prior Publication Data

US 2007/0230867 A1    Oct. 4, 2007

Related U.S. Application Data

(60) Provisional application No. 60/744,205, filed on Apr. 4, 2006.

(51) Int. Cl.
    *G02B 6/28* (2006.01)
    *H04J 14/02* (2006.01)
(52) U.S. Cl. ............................ 385/24; 385/37; 398/83; 398/84; 398/85
(58) Field of Classification Search .................. 385/18, 385/24, 36–37; 398/83–86
    See application file for complete search history.

(56) References Cited

U.S. PATENT DOCUMENTS

| | | | |
|---|---|---|---|
| 5,361,155 A | 11/1994 | Chiaroni et al. | 398/88 |
| 5,930,039 A | 7/1999 | Li et al. | 359/484 |
| 6,498,872 B2 | 12/2002 | Bouevitch et al. | 385/24 |
| 6,707,959 B2 | 3/2004 | Ducellier et al. | 385/17 |
| 6,714,743 B2 | 3/2004 | Hsieh et al. | 398/212 |
| 6,728,041 B2 | 4/2004 | Chang et al. | 359/634 |
| 6,810,169 B2 | 10/2004 | Bouevitch et al. | 385/24 |
| 6,847,757 B2 | 1/2005 | Chang et al. | 385/24 |
| 7,027,684 B2 | 4/2006 | Ducellier et al. | 385/24 |
| 7,062,122 B2 | 6/2006 | Bergeron et al. | 385/24 |
| 2003/0095307 A1* | 5/2003 | Moon et al. | 359/117 |
| 2004/0141681 A1* | 7/2004 | Weverka et al. | 385/18 |

* cited by examiner

*Primary Examiner*—Hemang Sanghavi
(74) *Attorney, Agent, or Firm*—Allen, Dyer, Doppelt, Milbrath & Gilchrist, P.A.

(57) ABSTRACT

The tunable add/drop multiplexer including a tiltable mirror, a fixed thin film filter, and first and second retro-reflector elements for redirecting express channels back out an input/output port and for redirecting drop channels back out an add/drop port, respectively.

15 Claims, 12 Drawing Sheets

TUNABLE OPTICAL ADD/DROP MULTIPLEXER

CROSS-REFERENCE TO RELATED APPLICATIONS

The present invention claims priority from U.S. Patent Application No. 60/744,205 filed Apr. 4, 2006, which is incorporated herein by reference for all purposes.

TECHNICAL FIELD

The present invention relates to a tunable optical add/drop multiplexer (TOADM), and in particular to a TOADM utilizing a tiltable mirror and a fixed thin film filter.

BACKGROUND OF THE INVENTION

Tunable optical add/drop multiplexers (TOADM) or reconfigurable optical add/drop multiplexers (ROADM) are an integral part of next generation optical networks, and they are the building blocks of Agile Optical Networks, because they provide the flexibility to remotely tune or reconfigure any or all wavelengths, thereby reducing time-to-service, simplifying the network, and streamlining planning and management.

The basic requirements for TOADM's or ROADM's are: flat-top filter characteristic for drop/add function, low insertion loss in express channels, no-hit to express channels during switching process, low cost, and reduced form factor.

Conventional add/drop multiplexers, such as those disclosed in U.S. Pat. Nos. 6,498,872 issued Dec. 24, 2002 to Bouevitch et al, 6,707,959 issued Mar. 16, 2004 to Ducellier et al, 6,810,169 issued Oct. 26, 2004 to Bouevitch et al and 7,027,684 issued Apr. 22, 2006 to Ducellier et al, comprise wavelength dispersing elements, e.g. diffraction gratings, for dispersing an optical signal into constituent wavelength channels, and an array of micro-electro-mechanical mirrors for independently directing each of the wavelength channels to selected output ports.

Other conventional TOADM's, which are based on thin film filter (TFF) technology, such as those disclosed in U.S. Pat. Nos. 6,728,041 issued Apr. 27, 2004 to Chang et al; and 6,847,757 issued Jan. 25, 2005 to Chang et al, rely on rotating the thin film filter to select which wavelength channel is separated from the input optical signal.

The key issue of the technology for rotating tunable filters and TOADMs is how to control the angle and the position of the reflected and transmitted optical beams, when they pass through or are reflected by the TFF. Conventional rotating tunable optical filters, such as the one disclosed in U.S. Pat. No. 5,361,155 issued Nov. 1, 1994 to Chiaroni et al, uses a co-axial plate to compensate the walk-off introduced by the change in angle of the rotating TFF. U.S. Pat. No. 6,714,743 issued Mar. 30, 2004 to Hsieh et al discloses a tunable filter in which a mirror is rotated simultaneously with the TFF, enabling the angle of the reflected beam to be unchanged, i.e. enabling the reflected and transmitted beams to travel in parallel. Unfortunately, the mirror and the TFF need to be rotated simultaneously, necessitating a transmissive mounting block assembly supporting the mirror and the TFF, and a highly accurate alignment process.

In the instance where it is desired to change the added or dropped wavelength channel, it is easily accomplished without having to replace the filter element, or the entire add/drop device with another having the desired bandpass characteristics. This is typically accomplished by repositioning the filter with respect to an incident optical beam. However, one unfortunate aspect resulting from dynamically tuning an add/drop device is that intermediate wavelength channels, those channels having wavelengths existing between that of the initially tuned channel and that of the finally tuned channel, will each sequentially exhibit a temporary loss of signal continuity as the filter is tuned to each respective channel's wavelength. This occurs because the point of incidence of the optical beam upon the filter, in transitioning from a point corresponding to the initially tuned channel to a point corresponding to the finally tuned channel, passes filter locations corresponding to each of the intermediate channels. When the composite optical signal light strikes filter locations corresponding to intermediate wavelength channels, intermittent data loss from those intermediate wavelength channels results. Such an intermittent loss of data is often referred to as a so-called "hit." The deleterious effects of a data hit, to the devices for which the data is intended to be transmitted, are well known. Devices exposed to such a data loss must either compensate for the loss of data, or request retransmission of the lost data. Ultimately, such data loss results in diminished quality of service, decreased bandwidth efficiency, or both An object of the present invention is to overcome the shortcomings of the prior art by providing a TOADM using a tiltable mirror device and a fixed thin film filter. The present invention further comprises optical retro-reflectors working with the tiltable mirror, keeping both direction and position of a reflected beam fixed, while tilting the mirror, ensuring low coupling loss in all ports for add/drop and express channels.

SUMMARY OF THE INVENTION

Accordingly, the present invention relates to a tunable optical add/drop module (TOADM) comprising:

an input/output port for inputting an input optical beam with a plurality of optical wavelength channels, and for outputting an output optical beam with at least one of the plurality of optical wavelength channels;

an add/drop port for outputting a drop beam with at least one of the optical wavelength channels;

a tiltable mirror rotatable about a rotation axis to one of a plurality of tilt angles for directing the optical beam along one of a plurality of different paths;

a fixed thin film filter (TFF) positioned to receive the input optical beam along any one of the plurality of different paths for splitting the optical beam into a transmittance beam, which includes the at least one drop channel, and a reflection beam, which includes at least one of the plurality of optical channels in the output beam, wherein each one of the plurality of different paths corresponds to a different wavelength channel to be dropped;

a first general retro-reflector means for reflecting said transmitted beam back with a lateral shift in position to the add/drop port via the thin film filter and the tiltable mirror; and a second general retro-reflector means for reflecting said reflected beam back to the input/output port via the thin film filter and the tiltable mirror.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
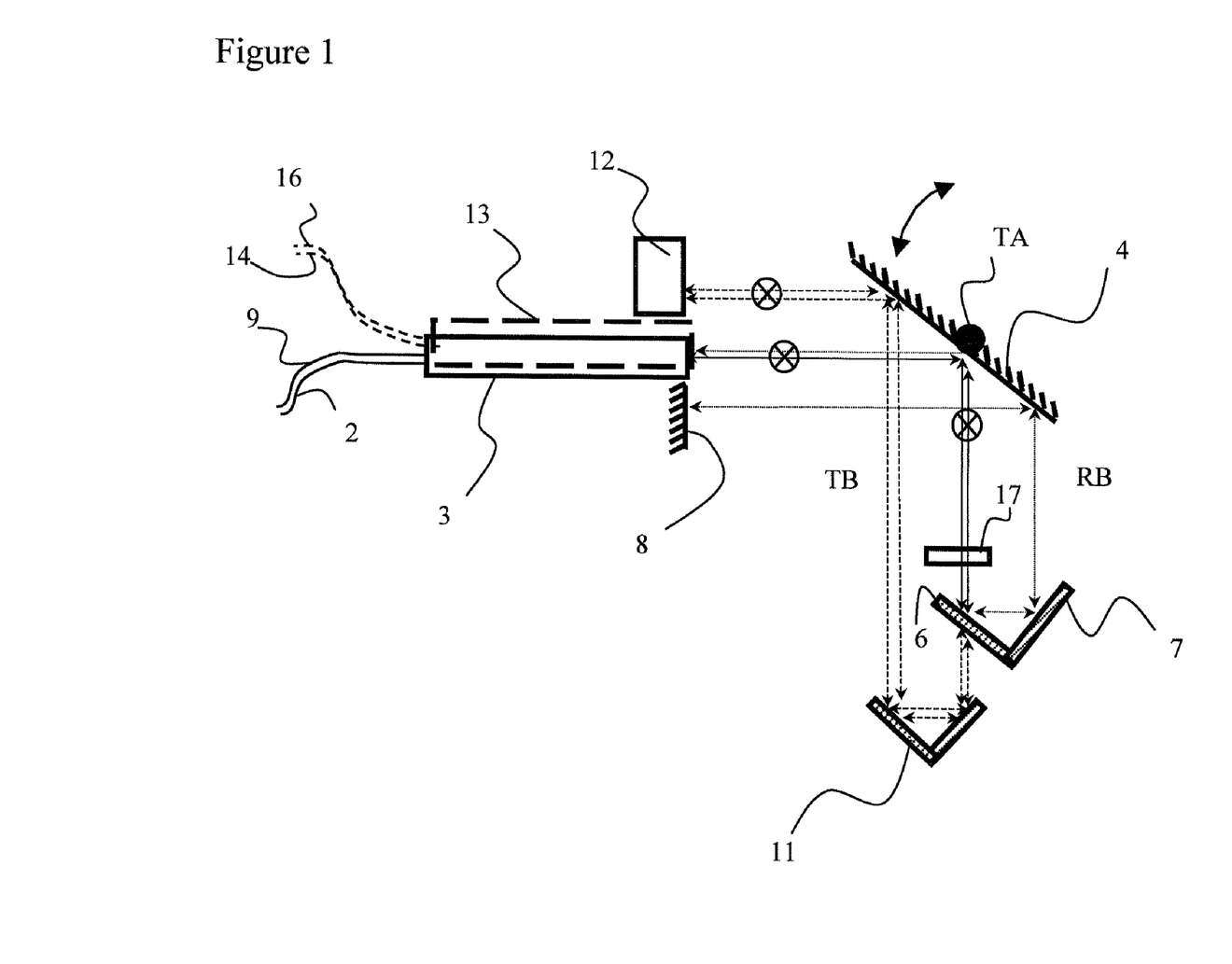
FIG. 1 is a side view of a TOADM according to the present invention.

With reference to FIG. 1, a TOADM 1 according an embodiment of the present invention includes an input fiber 2 for launching an input optical beam comprising a plurality of wavelength channels ($\lambda_1$ to $\pi_n$) into an input port of a first circulator 3. The first circulator 3 passes light from the input port at one end thereof to an input/output port at an opposite end thereof, while passing light entering the input/output port to an output port adjacent the input port. An exemplary circulator is illustrated with reference to FIGS. 4 to 7, but any suitable circulator will suffice. From the input/output port the input optical beam, typically in the form of two identically polarized sub-beams, propagates to a tiltable mirror 4, which redirects the input optical beam to a stationary thin film filter (TFF) 6. The incident angle and the position of the input optical beam on the TFF 6 is changed by tilting the mirror 4 about the tilt axis TA, not by changing the position of the TFF 6, whereby the passband of the TFF 6 is tunable to pass any one of the wavelength channels in the input optical signal, as desired or selected. The TFF 6 splits the input optical beam into a transmit beam TB including a passband with one or more of the wavelength channels, e.g. $\lambda_{1D}$, which passes through the TFF 6, and a reflect beam RB including the remaining (express) wavelength channels, e.g. $\lambda_2$ to $\lambda_n$, which is reflected off of a perpendicular reflective surface 7, back to the tiltable mirror 4. The tiltable mirror 4, the TFF 6 and the reflective surface 7 form a first general retro-reflector for directing the reflect beam RB back to the input/output port of the first circulator all in the same original plane of travel. The reflect beam RB is redirected off of the tiltable mirror 4 along a path parallel to the original input optical beam to a fixed reflective surface 8, adjacent to the input/output port of the first circulator 3. The fixed reflective surface 8 reflects the reflect beam RB straight back off of the tiltable mirror 4, the perpendicular reflective surface 7, the TFF 6, the tiltable mirror 4 (again), and back to the input/output port of the first circulator 3. As stated above, optical beams entering the input/output port of the first circulator are directed to the output port for output an output fiber 9. Passing the reflect beam RB off of the TFF 6 a second time provides extra filtering to remove any remaining signal in the passband of the TFF 6.

The term "general retro-reflector" refers to a retro-reflector that enables both the direction and position of a reflected beam to be fixed, while changing the angle of one or more elements of the reflector, this is different from the conventional understanding of the term "retro-reflector", which refers to a device that keeps only the direction of a reflected beam fixed and in the reverse direction to the incident beam. Please note that the position of a reflected beam using a general retro-reflector can be fixed, however, it is not necessarily the same position where the beam is launched.

The transmit beam TB passes through the TFF 6 to a first retro-reflector 11, e.g. two reflective surfaces 90° apart, which redirects the transmit beam TB back to the tiltable mirror 4 adjacent to, but in the same plane as, the input optical signal. The tiltable mirror 4 redirects the transmit beam TB to a second retro-reflector 12, which laterally shifts the transmit beam TB perpendicularly to the original plane, i.e. into the page, and then redirects the transmit beam TB back to the tiltable mirror 4 in a different, i.e. parallel, plane than the original plane. The tiltable mirror 4 then redirects the transmit beam TB back to the first retro-reflector 11, and through the TFF 6 in the parallel plane adjacent to the original plane. Passing the transmit beam tB through the TFF 6 a second time provides higher isolation for the drop channel and extra filtering to remove any remaining signal not in the passband of the TFF 6. Subsequently, the transmit beam TB reflects off of the tiltable mirror 4, and is directed to an input/output port of a second circulator 13, which directs the transmit beam TB to an output (drop) port thereof for transmission via an output fiber 14. The second circulator 13 is adjacent to the first circulator 3 in the parallel plane. The first retro-reflector 11, the second perpendicular retro-reflector 12, and the tiltable mirror 4 form a second general retro-reflector for redirecting the transmit beam TB back to the input/output port of the second circulator 13 in a different parallel plane to the original plane.

The second circulator 13 also has an input (add) port adjacent to the output (drop) port and optically coupled to an input (add) fiber 16. An add signal comprised of wavelength channels dropped via the transmit beam TB or not in the original input signal can be added to the reflect beam RB via input (add) fiber 16 and the input (add) port of the second circulator 13. The second circulator 13 directs the add signal to the input/output port thereof and launches the add signal at the tiltable mirror 4, which redirects the add signal through the TFF 6, off of the first and second retro-reflectors 11 and 12, respectively, and into the original input plane. Subsequently, the add signal is directed off of the tiltable mirror 4, the first retro-reflector 11, through the TFF 6 for multiplexing with the express channels, off of the tiltable mirror 4, and into the input/output port of the first circulator 3 for output the output fiber 9.

Figure 2:
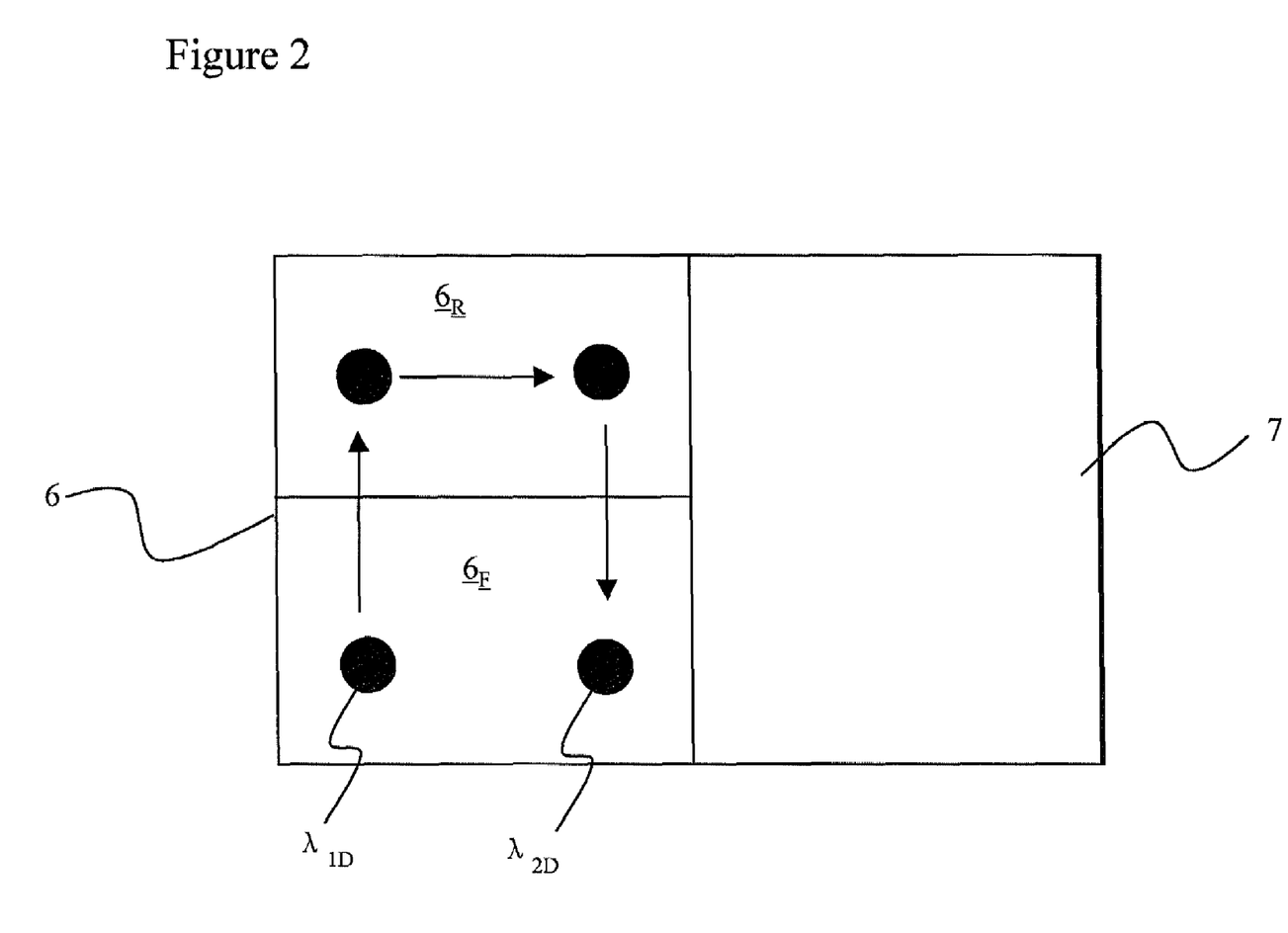
FIG. 2 is a top view of a thin film filter and a reflective surface for the TOADM of FIG. 1.
Figure 3:
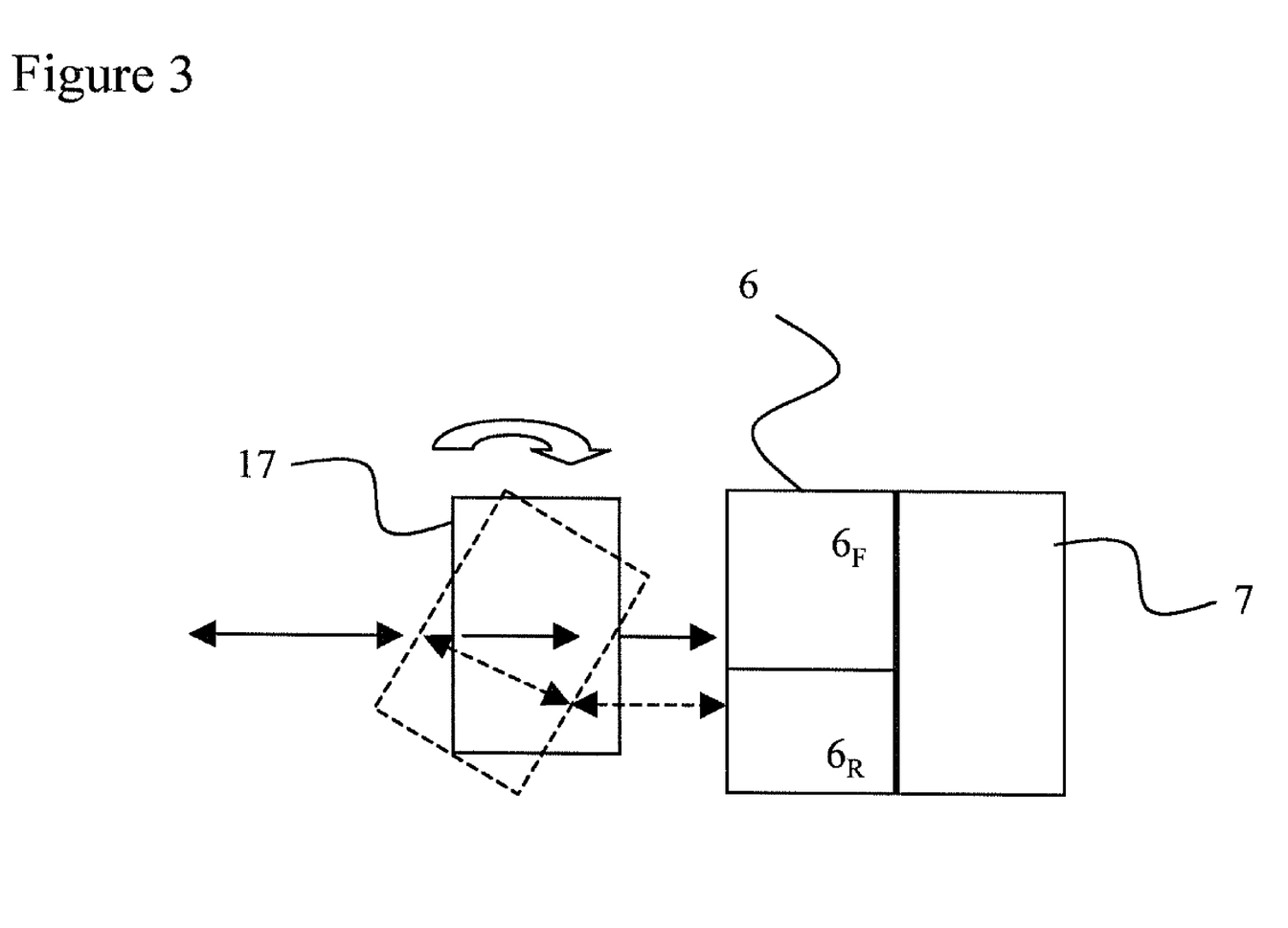
FIG. 3 is a front view of the thin film filter and walk-off block for the TOADM of FIG. 1.

Preferably, the TFF 6 comprises a "hitless" thin film filter, as illustrated in FIG. 2 comprising a filter section $6_F$ and a reflecting section $6_R$. Ideally the TFF 6 includes the phase and group delay matched filter and reflecting sections as disclosed in U.S. Pat. No. 7,062,122 issued Jun. 13, 2006 to Bergeron et al, which is incorporated herein by reference. As the tiltable mirror 4 is rotated to change the drop channel, i.e. to tune the transmit from one wavelength channel, e.g. $\lambda_{1D}$, to another non-adjacent wavelength channel, e.g. $\lambda_{2D}$, a rotating walk-off block 17 is rotated, as in FIG. 3, to switch the beam path of the input optical beam on the TFF 6 from the filter section 6$_F$ to the reflecting section 6$_R$, and vice versa, while the tiltable mirror 4 is rotated to a different position corresponding to a different drop channel. The walk-off block 17 can be any optical material with sufficient transparency and low chromatic dispersion, e.g. BK7. The walk-off block 17 redirects the input optical beam onto the reflecting section 6$_R$, which momentarily redirects all of the input optical beam off of the reflective surface 7 to follow the path of the aforementioned express channels. When the redirected input optical signal returns from the fixed reflective surface 8, the walk-off block 17 redirects the input optical beam back onto the original path for output to the input/output port of the first circulator 3 and the output fiber 9.

Figure 4:
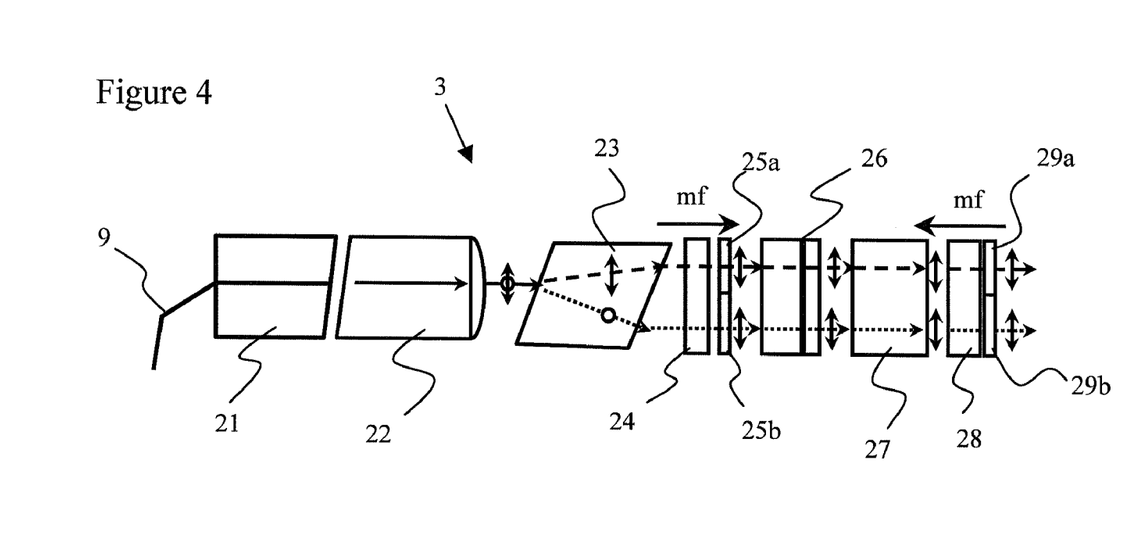
FIG. 4 is a side view of an embodiment of a circulator for the TOADM of FIG. 1 illustrating light traveling in the input direction.
Figure 5:
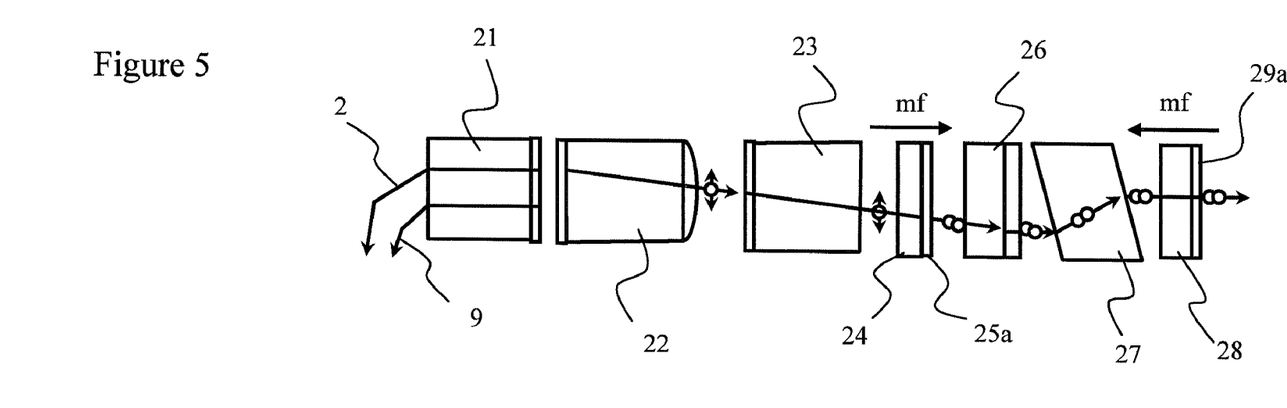
FIG. 5 is a top view of the circulator of FIG. 4.

With reference to FIGS. 4 to 7, the circulator 3 is preferably the circulator disclosed in U.S. Pat. No. 5,930,039 issued Jul. 22, 1999 to Li et al, which is incorporated herein by reference. With particular reference to FIGS. 4 and 5, as hereinbefore described, the input optical beam enters the circulator 3 via the input fiber 2, which is encased in a fiber ferrule 21 along with output fiber 9. Lens 22, optically coupled to the ends of the fibers 2 and 9, collimates the input optical signal onto a first birefringent crystal 23, which splits the input optical signal into two orthogonally polarized sub-beams, e.g. ordinary and extraordinary or vertical and horizontal. Subsequently, both sub-beams then pass through a first non-reciprocal polarization rotator comprised of a Faraday rotator 24 and a pair of half wave plate 25$a$ and 25$b$. A first sub-beam, e.g. the vertically polarized sub-beam is rotated 45° in one direction by the Faraday rotator 24 and 45° in the opposite direction by the half wave plate 25$a$, whereby there is no cumulative effect on the state of polarization. A second sub-beam, e.g. the horizontally polarized sub-beam, is rotated 45° in one direction by the Faraday rotator 24 and 45° in the same direction by the half wave plate 25$b$, whereby the cumulative effect is a rotation of 90°, i.e. parallel to the first sub-beam. Accordingly, both sub-beams exit the first non-reciprocal polarization rotator with the same polarization, e.g. vertically polarized. A Wollaston prism 26 is utilized to change the direction of the first and second sub-beams based on their polarization, and a second birefringent crystal 27 is used to direct the first and second sub-beams along an output path, e.g. extraordinary, to a second non-reciprocal rotator, comprised of a Faraday rotator 28 and a pair of half wave plates 29$a$ and 29$b$. In the input direction the second polarization rotator has no cumulative effect on the state of polarization of either of the first and second sub-beams, i.e. the Faraday rotator 28 rotates the polarization of the sub-beams in the opposite direction to the pair of half-wave plates 29$a$ and 29$b$, whereby both the first and second sub-beams are launched out of the input/output port at the tiltable mirror 4 with the same polarization, e.g. horizontal.

Figure 6:
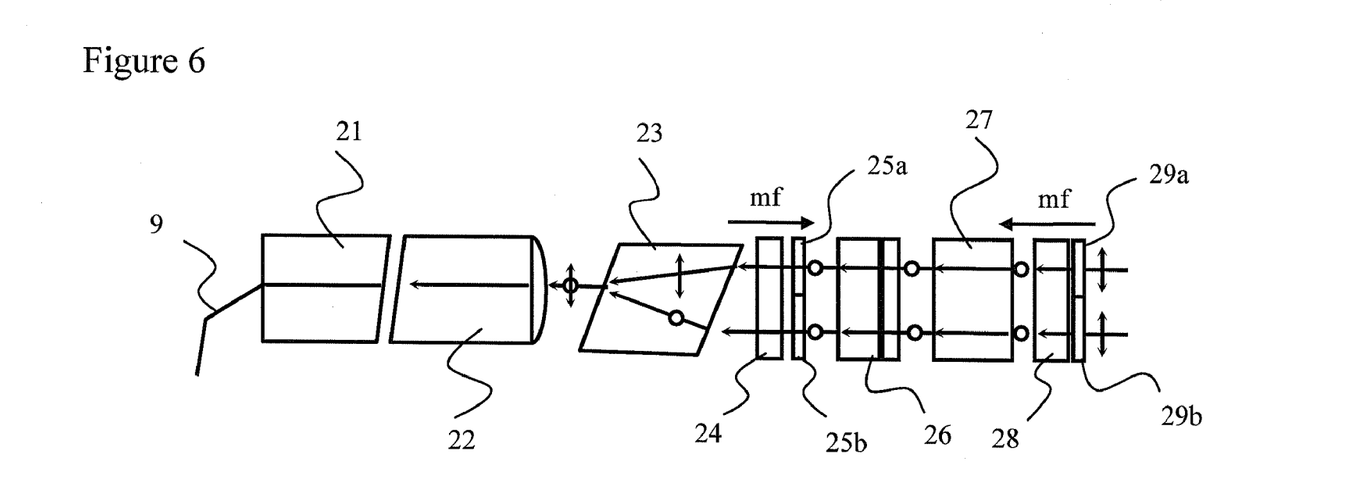
FIG. 6 is a side view of the an embodiment of the circulator of FIG. 4 illustrating light traveling in the output direction.
Figure 7:
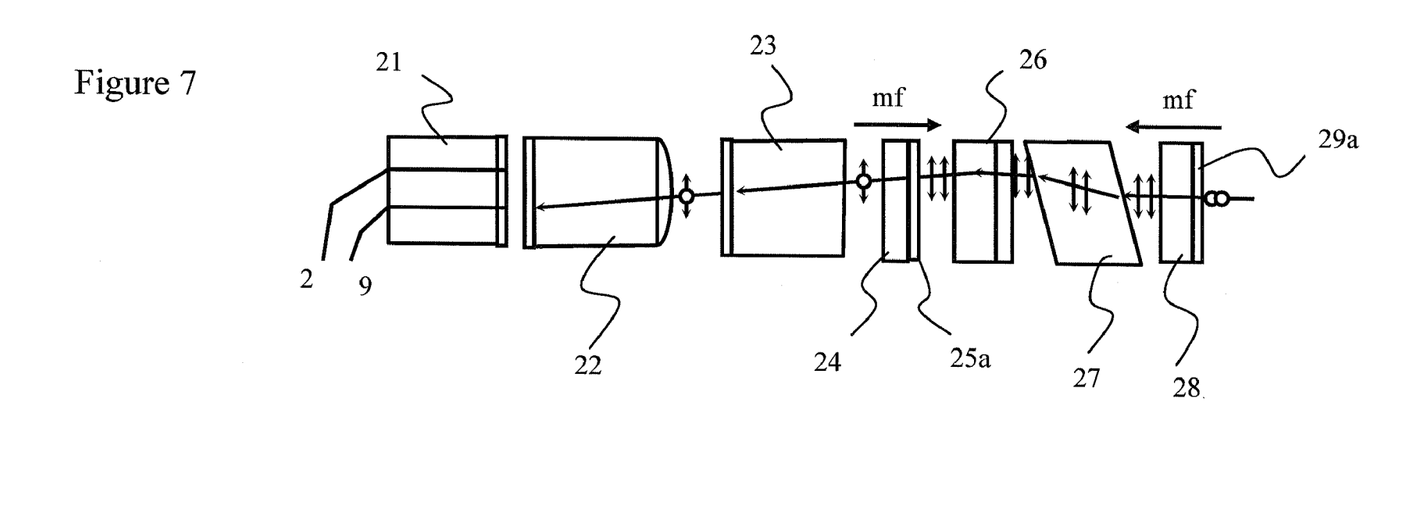
FIG. 7 is a top view of the circulator of FIG. 6.

With reference to FIGS. 6 and 7, when the express signal, i.e. the reflected beam RB with the add signal, is returned to the input/output port in the form of first and second sub-beams, the second non-reciprocal polarization rotator rotates the polarization of both the first and second sub-beams to the opposite polarization, e.g. vertical, i.e. the Wollaston prism 28 rotates the polarization of the sub-beams 45° in the same direction as the half wave plates 29$a$ and 29$b$ providing a total cumulative rotation of 90°. The second birefringent crystal 27 directs the sub-beams along a different path, e.g. ordinary, to the Wollaston prism 26, which changes the direction of the sub-beams towards the first non-reciprocal rotator. In the output direction, the first non-reciprocal rotator rotates the polarization of the first sub-beam by 90°, while having no cumulative effect on the polarization of the second sub-beam, i.e. the opposite to the aforementioned input direction. The first birefringent crystal 23 combines the two sub-beams into a single output signal, which is focused by the lens 22 onto the output fiber 9.

Preferably, the second circulator 13 performs in the same fashion as the first circulator 3 for the add signal and the drop signal.

Figure 8:
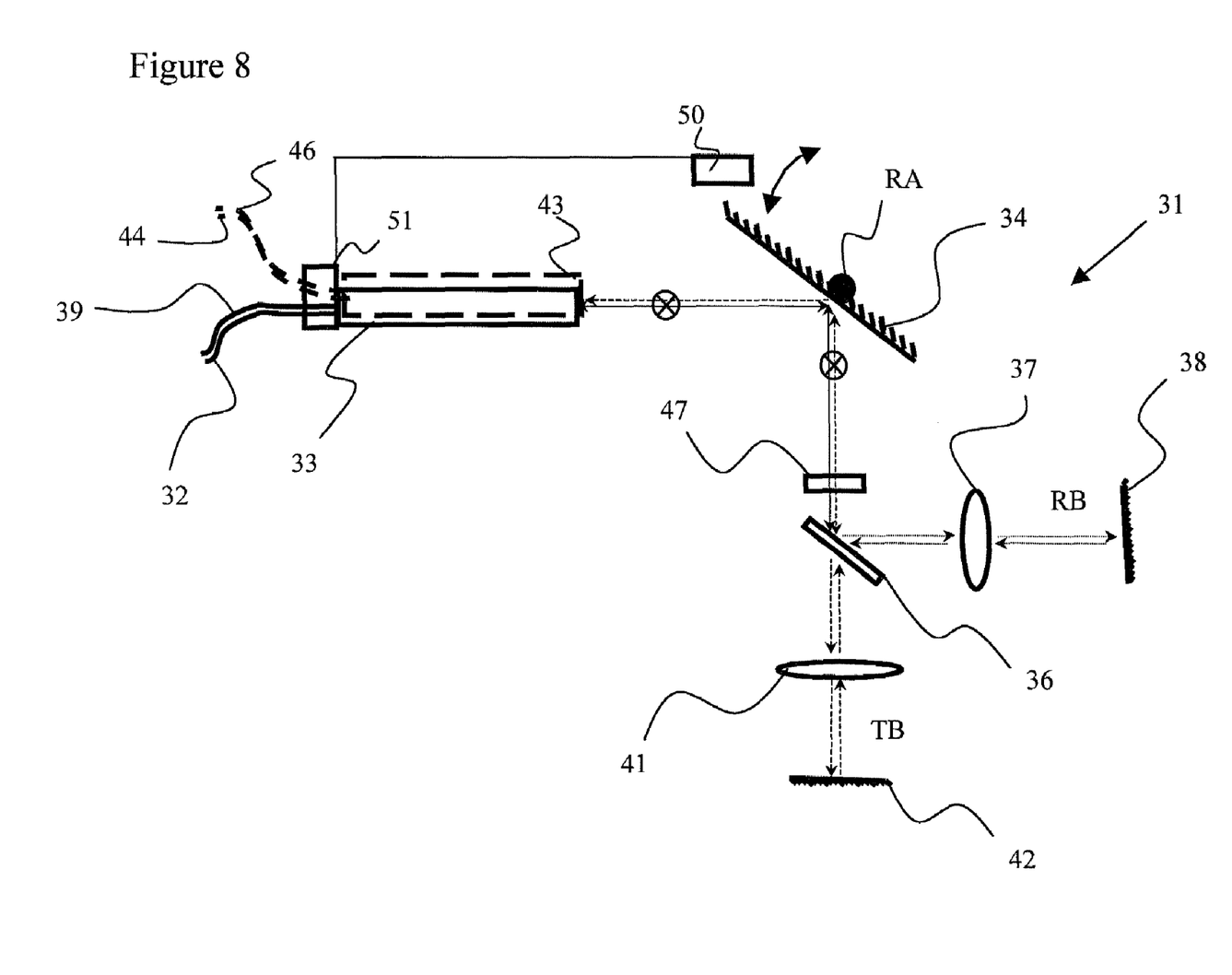
FIG. 8 is a side view of a TOADM according to another embodiment of the present invention.
Figure 9:
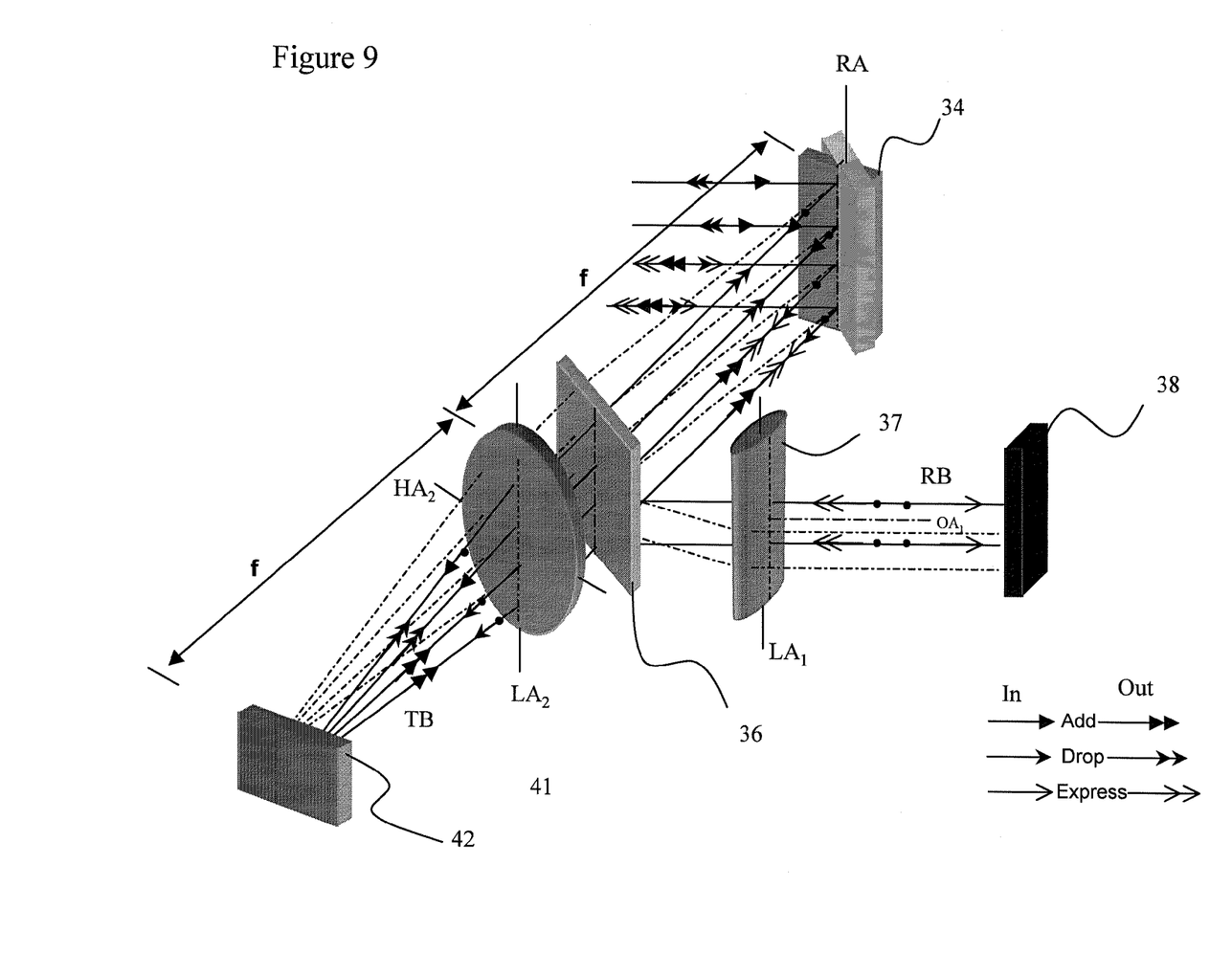
FIG. 9 is an isometric view of the TOADM of FIG. 8

With reference to FIGS. 8 and 9, another embodiment of a TOADM 31 according to the present invention includes an input fiber 32 optically coupled to a first circulator 33, similar to circulator 3, for launching an input optical signal including a plurality of wavelength channels, e.g. $\lambda_1$ to $\lambda_n$. A tiltable mirror 34, rotatable about rotation axis RA, redirects the input optical signal through a fixed TFF 36 at various locations and angles depending upon the selected and desired filter passband, i.e. drop channel $\lambda_{D1}$, as hereinbefore described with reference to TFF 6. The input optical signal is separated into a reflect (express) beam RB, which is directed through a first cylindrical lens 37, onto a reflective surface 38, and a transmit (drop) beam TB, which is passed through the TFF 36 on to a reflective surface 42.

Figure 10:
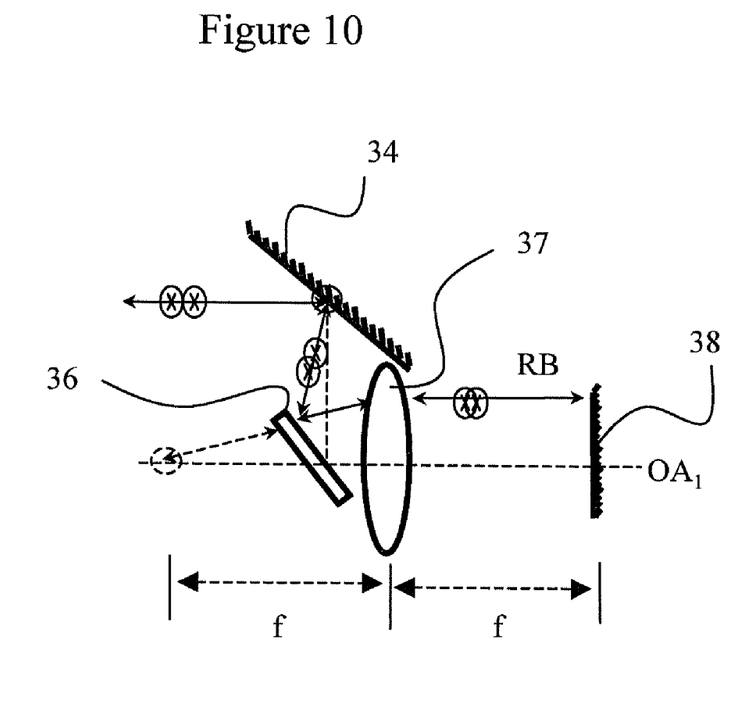
FIG. 10 illustrates the retro-reflector of a reflect (express) beam from the TOADM of FIG. 8.
Figure 11:
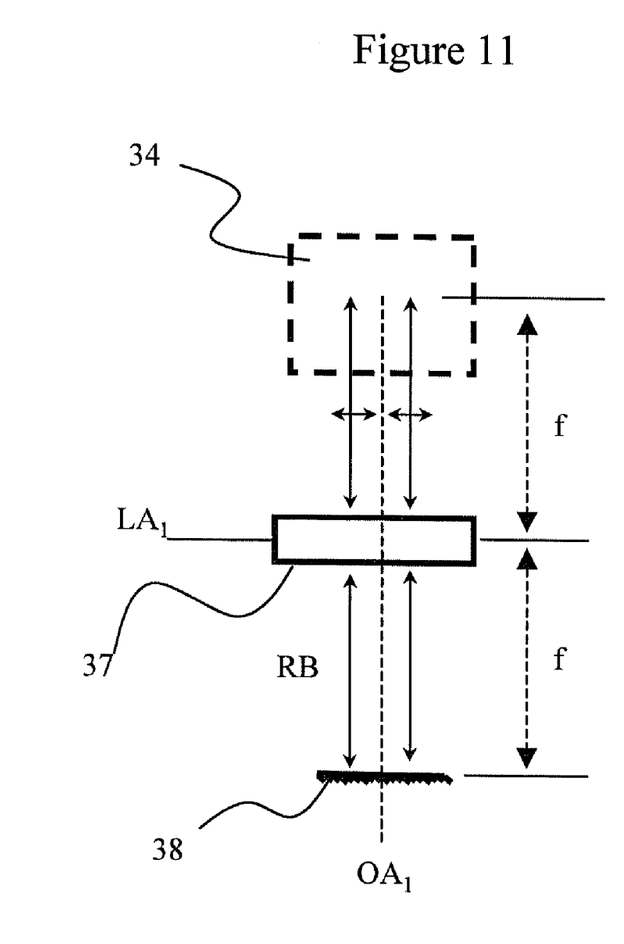
FIG. 11 is a front view of the retro-reflector of FIG. 10.

The longitudinal axis $LA_1$ is parallel to the reflective surface 38, and the optical axis $OA_1$ of the first lens 37 are perpendicular to the reflective surface 38. The first lens 37 is positioned such that the express (or reflect) beam RB intersecting the first lens 37 at normal incidence, i.e. parallel to the optical axis, will intersect the first lens 37 along the longitudinal axis $LA_1$ and pass straight through to the reflective surface 38 (see dashed line in FIG. 10). As the tiltable mirror 34 is rotated (see dashed line in FIG. 9 or solid line in FIG. 10), the express beam RB intersects the first lens 37 at an angle to the optical axis $OA_1$; however, the first lens 37 redirects the reflect beam TB parallel to the optical axis $OA_1$, whereby the reflect beam TB always hits the reflective surface 38 at normal incidence for reflecting the reflect beam TB straight back towards the first lens 37 along the same path. As illustrated in FIGS. 10 and 11, the reflective surface 38 directs the reflect beam RB back through the first cylindrical lens 37 onto the TFF 36, and off of the tiltable mirror 34 to the input/output port of the first circulator 33 along the same path as the input optical signal. As above, light entering the first circulator 33 from the input/output port is directed to an output fiber 39.

Figure 12:
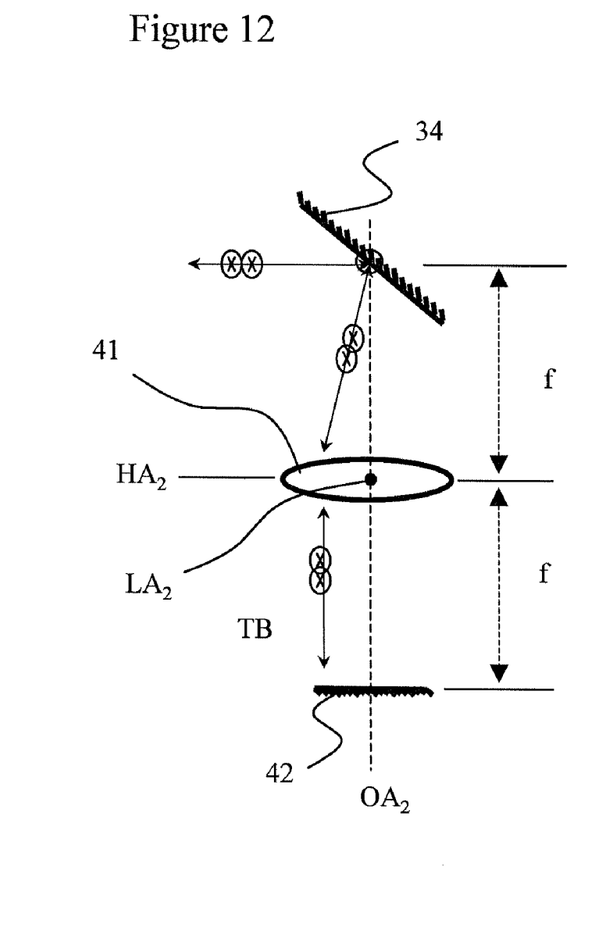
FIG. 12 illustrates the retro-reflector of a transmit (drop) beam from the TOADM of FIG. 8.
Figure 13:
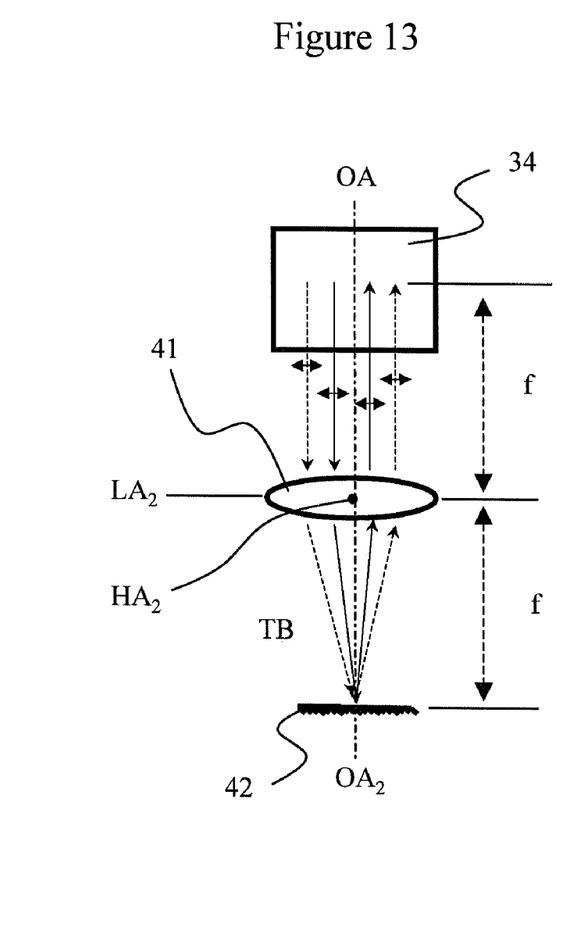
FIG. 13 is a front view of the retro-reflector of FIG. 12.

With reference to FIGS. 12 and 13, the drop (or transmit) beam TB, comprising the drop wavelength channel, e.g. $\lambda_{D1}$, passes through the TFF 36 and intersects a second symmetrical lens 41. If the drop beam TB, i.e. both sub-beams thereof, is parallel to the optical axis $OA_2$, (dashed line in FIG. 12 and solid line in FIG. 9) then the drop beam intersects the second lens 41 along the longitudinal axis $LA_2$ on one side of the horizontal axis $HA_2$, and is directed at an acute incident angle to the reflective surface 42 hitting the reflective surface 42 along the optical axis $OA_2$ of the second lens 41, and subsequently reflected at a reflection angle (equal to the incident angle) back to the second lens 41 on the other side of the horizontal axis $HA_2$. As the tiltable mirror 34 is rotated, the drop beam TB changes its angle of incidence on the second lens 41 (see dashed line in FIG. 9 and solid line in FIG. 12), and travels laterally along on one side the horizontal axis $HA_2$ away from the longitudinal axis $LA_2$. The second lens 41 redirects the drop beam TB back into a plane parallel to the optical axis (FIG. 12), and redirects the drop beam TB at an acute incident angle to the reflective surface 42 hitting the reflective surface 42 adjacent the optical axis $OA_2$. Subsequently, the drop beam TB reflects at a reflection angle, equal to the incident angle, back to the second lens 41 on the other side of the horizontal axis $HA_2$. The second lens 41 then redirects the transmit beam TB, along a path parallel to the original path from the tiltable mirror 34, back through the TFF 36 to the tiltable mirror 34 and into the input/output port of a second circulator 43, similar to the second circulator 13, for output an output fiber 46.

To enable the direction and position of the transmit and reflect beams to be fixed while the tiltable mirror 34 tilts, preferably the following conditions are satisfied: 1) the rotation axis RA of the tiltable mirror 34 is on the focal plane of the second lens 41; 2) the fixed mirror 42 is also located one focal length away from another side of the second lens 41; 3) the optical axis $OA_2$ of the second lens 41 intersects the rotation axis of tiltable mirror 34; and 4) the center of the input optical signal sub-beams are incident on the rotation axis RA of the tiltable mirror 34.

Preferably, the TFF 36 comprises a "hitless" thin film filter, as illustrated in FIG. 2 comprising a filter section $6_F$ and a reflecting section $6_R$. Ideally the TFF 36 includes the phase and group delay matched filter and reflecting sections as disclosed in U.S. Pat. No. 7,062,122 issued Jun. 13, 2006 to Bergeron et al, which is incorporated herein by reference. As the tiltable mirror 34 is rotated to change the drop channel, i.e. to tune the transmit from one wavelength channel, e.g. $\lambda_{1D}$, to another non-adjacent wavelength channel, e.g. $\lambda_{2D}$, a rotating walk-off block 47 is rotated, as in FIG. 3, to switch the beam path of the input optical beam on the TFF 36 from the filter section $6_F$ to the reflecting section $6_R$, and vice versa, while the tiltable mirror 34 is rotated to a different position corresponding to a different drop channel. The walk-off block 47 can be any optical material with sufficient transparency and low chromatic dispersion, e.g. BK7. The walk-off block 47 redirects the input optical beam onto the reflecting section $6_R$, which momentarily redirects all of the input optical beam off of the reflective surface 38 to follow the path of the aforementioned express channels. When the redirected input optical signal returns from the fixed reflective surface 38, the walk-off block 47 redirects the input optical beam back onto the original path for output the input/output port of the first circulator 33 and the output fiber 32.

The second circulator 43 also has an input (add) port adjacent to the output (drop) port and optically coupled to an input (add) fiber 44. An add signal comprised of wavelength channels dropped via the transmit beam TB or not in the original input signal can be added to the reflect beam RB via input (add) fiber 44 and the input (add) port of the second circulator 43. The second circulator 43 directs the add signal to the input/output port thereof and launches the add signal at the tiltable mirror 34, which redirects the add signal through the TFF 36, off of the reflective surface 42, and into the original input plane. Subsequently, the add signal is directed through the TFF 36 for multiplexing with the express channels, off of the tiltable mirror 34, and into the input/output port of the first circulator 33 for output the output fiber 39.

An angle detector module 50 is used to measure and indicate the angle of the tiltable mirror 34 (or 4), which is correlated with monitored channel wavelength information from monitor 51 to set the correct angle for a desired or selected drop channel and to compensate for various factors, e.g. temperature, over time. The angle detector module 50 can be a capacity measurement based angular sensor or a LED-detector based angular sensor.

The retro-reflectors of the present invention provide the basic structure for a tiltable mirror based scanning device, whereby functional components can be inserted between the tiltable mirror and the fixed mirrors, and the angle or position of the beam changes, while the mirror tilts, e.g. realizing optical filtering, variable attenuation, etc.

Figure 14:
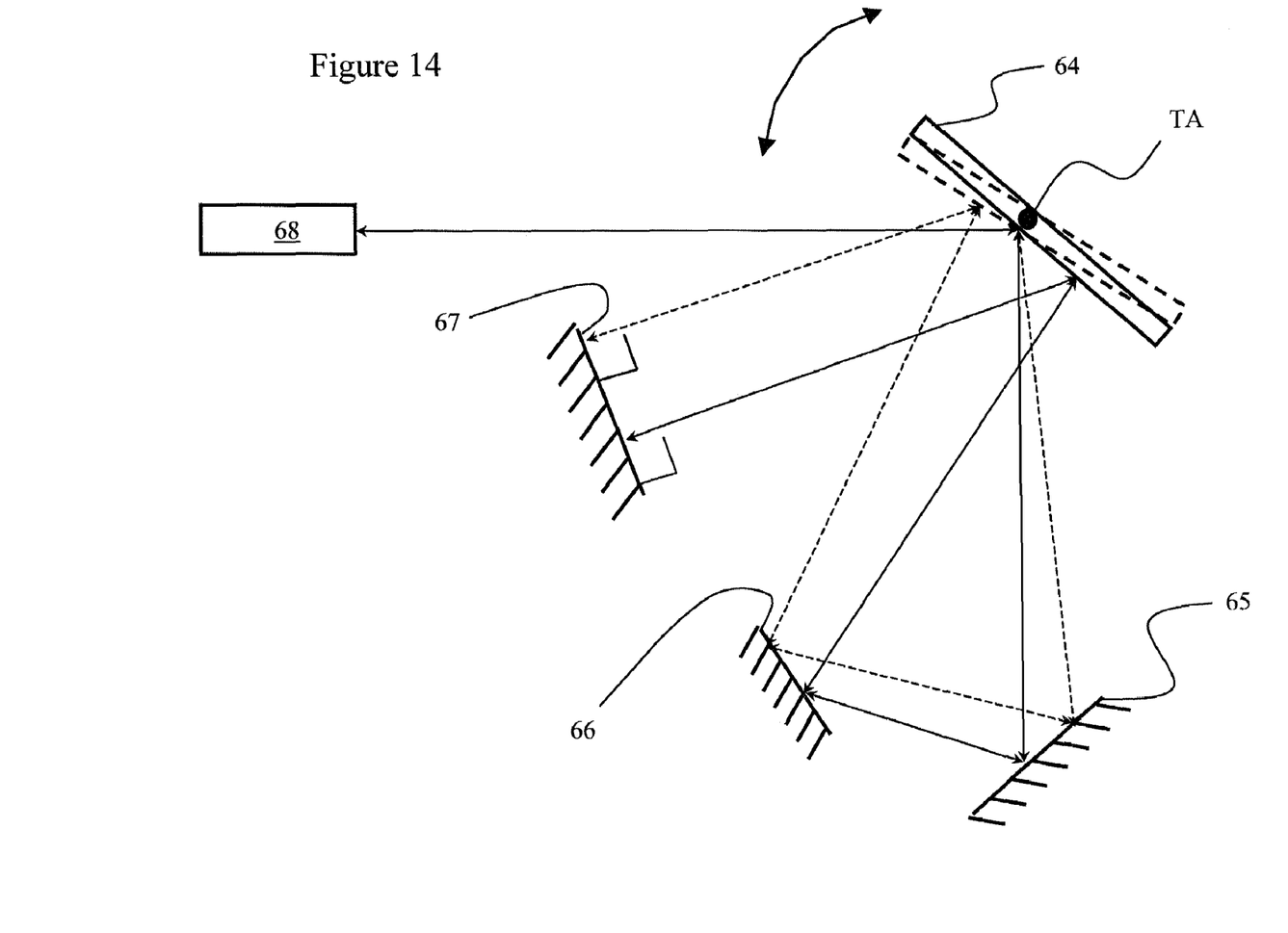
FIG. 14 is a side view of an embodiment of a retro-reflector in accordance with the present invention.

The apparatus of a first embodiment illustrated in FIG. 14 comprises a tiltable mirror 64 with a tilting axis TA, a first fixed angled mirror 65, a second fixed angled mirror 66, and a third fixed end mirror 67, similar to the elements used in the embodiment of FIG. 1 for the reflect beam RB. An input beam launched from an input/output port 68 is incident on the tiltable mirror 64 along the tilting axis TA, and is reflected to the first fixed mirror 65 with an initial angle of reflection. The first fixed mirror 65 reflects the beam to the second fixed mirror 66, which reflects the beam back to the tiltable mirror 64 at a position adjacent to the tilting axis TA. The tiltable mirror 64 reflects the beam a second time to the third fixed mirror 67.

The angle of the beam arriving at the third fixed mirror 67 remains unchanged, i.e. 0° to the normal of the third fixed mirror 67 or perpendicular to the face of the third fixed mirror 67, even while the tiltable mirror 64 is rotated, i.e. changing the initial angle of reflection. The third fixed mirror 67 is arranged so that it's normal direction is parallel to the direction of the incoming beam reflected from the tiltable mirror 64 the second time, thus the beam is reflected, and propagates in reverse via the tiltable mirror 64, the second mirror 66, the first mirror 65, and the tiltable mirror 64 a fourth time, and back to the input/output port 68 with a fixed direction and position.

Note that the first and second fixed mirrors 65 and 66 are not necessarily perpendicular to each other. While the perpendicularity is a requirement in the conventional definition of the term "retro-reflection", there is no such requirement for the first and second fixed mirrors 65 and 66, which simply reflect the beam back to the tiltable mirror 64. The direction of the beam reflected by the tiltable mirror 64 the second time is kept constant, i.e. normal to the third fixed mirror 67, as long as the angle of the input beam is fixed, i.e. the reflected angle is independent of the tilting angle of the tiltable mirror 64, but the position of the beam arriving on the third mirror 67 changes each time the tiltable mirror 64 is rotated. This is a consequence of the double reflection by the tiltable mirror 64, and the reflection by the first and second fixed mirrors 65 and 66. The third fixed mirror 67 is arranged so that any beam directed thereat is normal thereto, thus the beam will be reflected straight back resulting in reversed propagation, and tracing back it's path back through the tiltable mirror 64, a third time, the second mirror 66, the first mirror 65, and the tiltable mirror 64, a fourth time, in sequence, to the input/output port 68.

Moreover, the reflection rates of the first, second and third fixed mirrors 65, 66 and 67 are not all necessarily 100%, one or more of them can be a taped mirror, which allows part of the power to be transmitted therethrough, which is useful for detecting the power lever of the input beam just by putting a PD behind the taped mirror.

Figure 15:
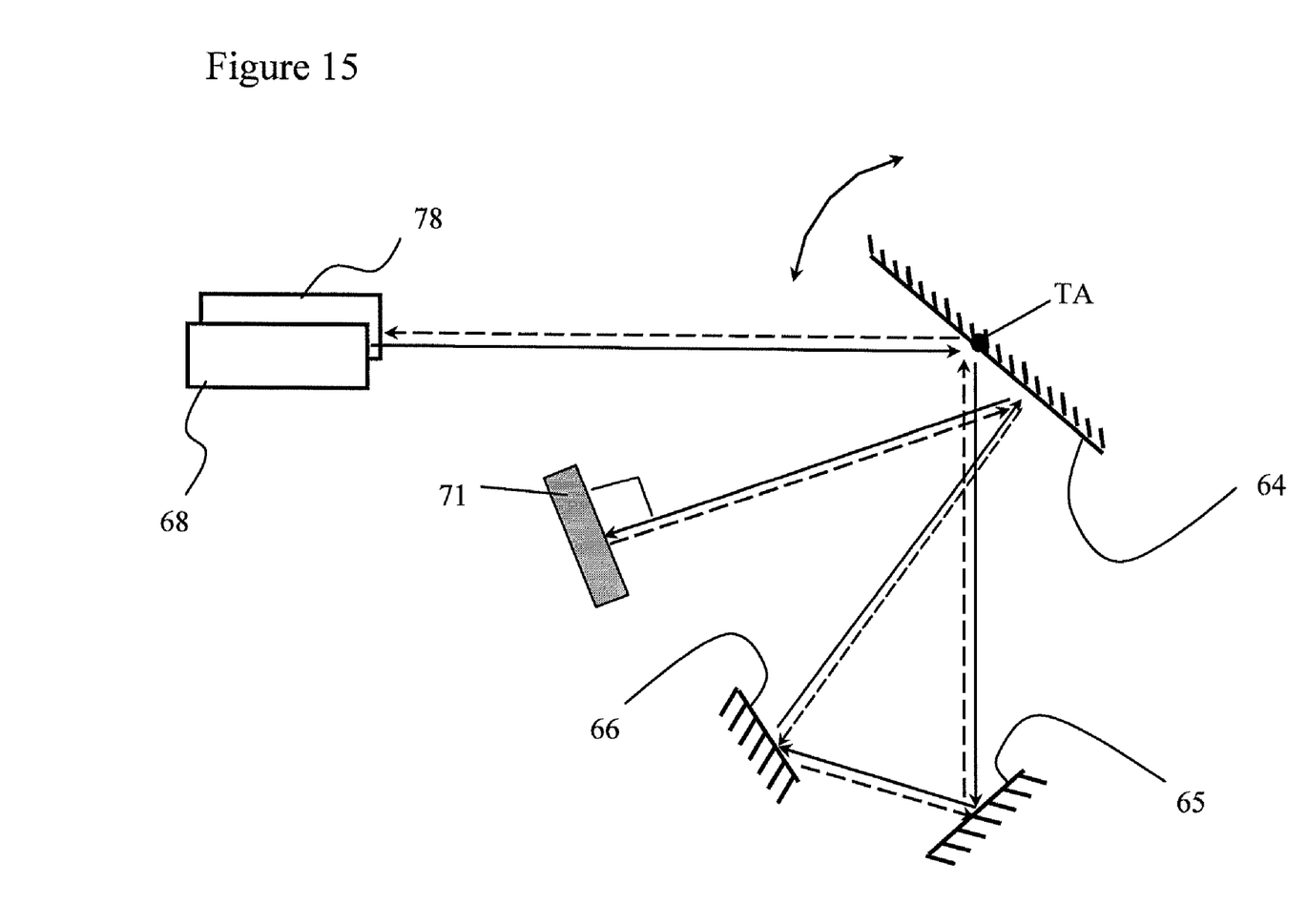
FIG. 15 is a side view of another embodiment of a retro-reflector in accordance with the present invention.

A second embodiment of the present invention is illustrated in FIG. 15, wherein the tiltable mirror 65, the first fixed mirror 66 and the second fixed mirror 67 are generally the same as above, but the third fixed mirror is replaced by a vertically (into the page) arranged retro-reflector 71, which enables the beam be laterally shifted a certain amount into a different, parallel plane, e.g. parallel with the plane of the page, so that reflected beam does not go back to the input/output port 68, but an adjacent input/output port 78, similar to the elements used in the embodiment of FIG. 1 for the transmit beam TB. The amount of displacement is determined by the position of the retro-reflector 71, providing a desired or required separation between the input and reflected beam (output). The retro-reflector 71 comprises two perpendicular mirror plates, whose cross line is perpendicular to the beam incident thereon.

Figure 16:
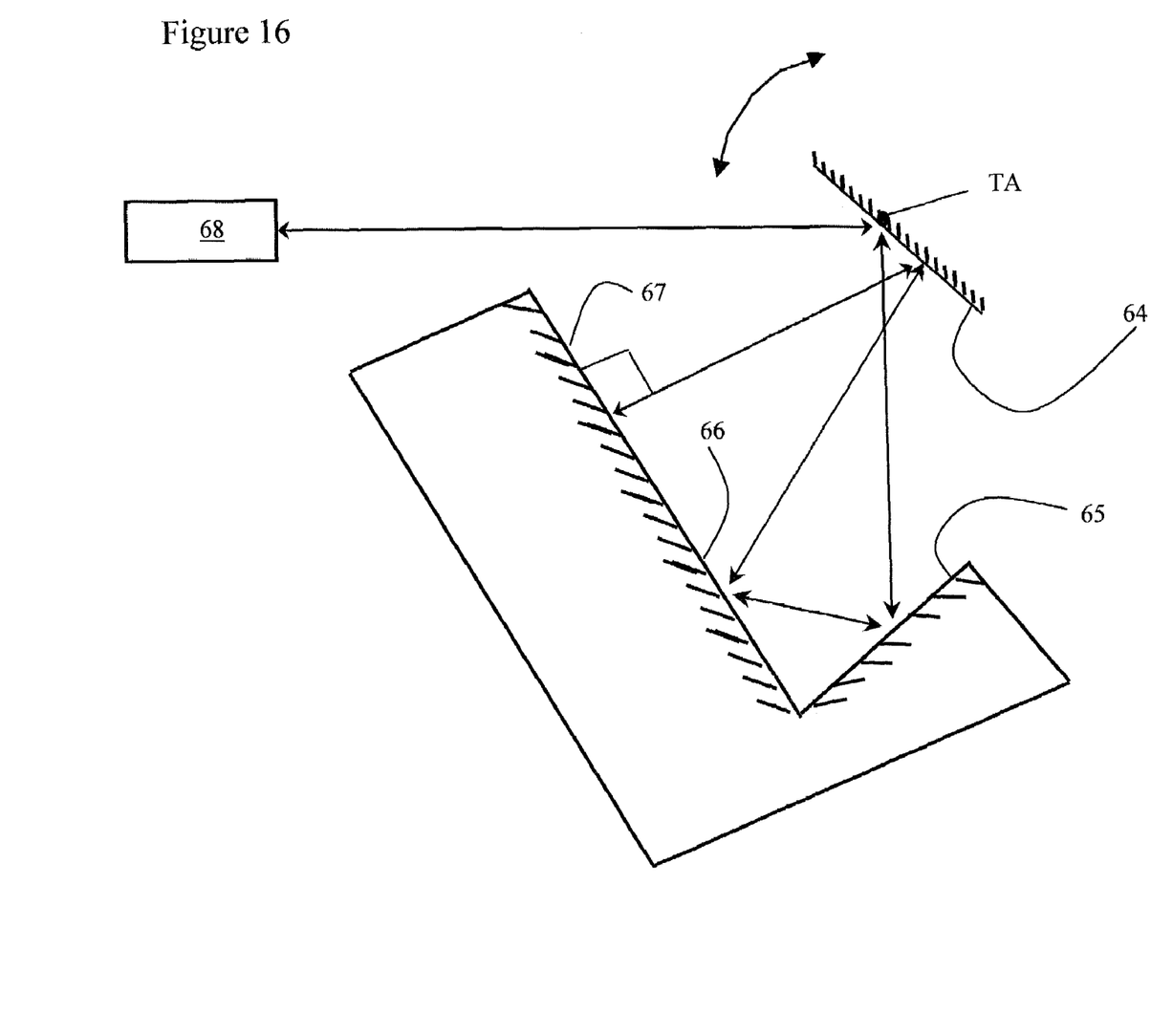
FIG. 16 is a side view of another embodiment of a retro-reflector in accordance with the present invention.

FIG. 16 illustrates a more compact embodiment in which the first and second fixed mirror 65 and 66 are formed in the same plane, and preferably contiguously integrated and coated on the same base or substrate. Furthermore, the first, second and third fixed mirrors 65, 66 and 67 can be formed by coating a reflective surface onto a single L-shaped or substantially L-shaped block or onto perpendicular or substantially perpendicular surfaces formed in a single block of material. Other compact embodiments can be found, without escaping the spirit of this invention.

We claim:

1. A tunable optical add/drop module (TOADM) comprising:
   an input/output port for inputting an input optical beam with a plurality of optical wavelength channels, and for outputting an output optical beam with at least one of the plurality of optical wavelength channels;
   an add/drop port for outputting a drop beam with at least one of the optical wavelength channels;
   a tiltable mirror rotatable about a rotation axis to one of a plurality of tilt angles for directing the optical beam along one of a plurality of different paths;
   a fixed thin film filter (TFF) positioned to receive the input optical beam along any one of the plurality of different paths for splitting the optical beam into a transmittance beam, which includes the at least one drop channel, and a reflection beam, which includes at least one of the plurality of optical channels in the output beam, wherein each one of the plurality of different paths corresponds to a different wavelength channel to be dropped;
   a first general retro-reflector means for reflecting said transmitted beam back with a lateral shift in position to the add/drop port via the thin film filter and the tiltable mirror; and
   a second general retro-reflector means for reflecting said reflected beam back to the input/output port via the thin film filter and the tiltable mirror.

2. The TOADM according to claim 1, wherein the add/drop port is also for inputting an add beam comprising at least one optical channel, which is redirected by the tiltable mirror to the thin film filter, which redirects the add beam to the first general retro-reflector for redirecting the add beam to the input/output port via the thin film filter and the tiltable mirror for combination into the output beam.

3. The TOADM according to claim 1, wherein said tiltable mirror comprises a tilting MEMs actuator.

4. The TOADM according to claim 1, wherein said first general retro-reflector means comprises: an in-plane retro-reflector for reflecting the transmitted beam back in a same plane as the input/output port, and an out-of-plane retro-reflector for reflecting said transmitted beam back with a lateral shift in position into a different plane, which includes the add/drop port; whereby said first general retro-reflector means and said tiltable mirror direct the transmitted beam from said TFF back through the TFF for a second time, and out the add/drop port.

5. The TOADM according to claim 1, said second general retro-reflector means comprises: a first and second fixed mirrors for reflecting the reflected beam back in a same plane as the input/output port; whereby said first fixed mirror reflects the reflected beam off of the tiltable mirror to the second fixed mirror, which reflects the reflected beam back along the same path to said tiltable mirror, said first fixed mirror, the TFF for a second time, and out the input/output port.

6. The TOADM according to claim 1, wherein said first general retro-reflector comprises: a first lens, and a first mirrored surface located at the focal plane of said first lens; wherein the rotating axis of said tiltable mirror is on another focal plane of said first lens; wherein the optical axis of the first lens intersects the rotating axis of tiltable mirror; and wherein the center of the input optical beam is incident on the rotation axis of said tiltable mirror.

7. The TOADM according to claim 6, wherein said first lens is a symmetrical lens for reflecting the transmit beam from the TFF back through the TFF a second time in a same plane as the add/drop port.

8. The TOADM according to claim 1, wherein said second general retro-reflector comprises: a second lens, and a second mirrored surface located at the focal plane of said second lens; wherein the rotation axis of said tiltable mirror is on another focal plane of said second lens; and wherein a center of the input optical beam is incident on the rotation axis of said tiltable mirror.

9. The TOADM according to claim 8, wherein said second lens is a cylindrical lens defined by an optical axis for directing the transmit beam from the TFF back along a path parallel to the optical axis of the second lens and normal to the second mirrored surface, whereby the second mirrored surface directs the reflected beam straight back through the second lens and off of the TFF a second time in a same plane as the input/output port.

10. The TOADM according to claim 1, further comprising an angular sensor for measuring the tilt angle of the tiltable mirror; and an optical channel monitor for monitoring the drop beam to ensure the tilt angle of the tiltable mirror is set correctly.

11. The TOADM according to claim 1, wherein said thin film filter is a hitless thin film filter comprise a filter area and a reflection area; further comprising an optical path switch means to switch the beam from said filter area to reflection area and vice versa, while the tiltable mirror is being rotated.

12. The TOADM according to claim 1, wherein said thin film filter is a hitless thin film filter comprise a filter area and a reflection area, whose phase and group delay are matched; further comprising an optical path switch means to switch the beam from said filter area to reflection area and vice versa, while the tiltable mirror is being rotated.

13. The TOADM according to claim 11, wherein the optical path switch means comprises a first rotating block on one side of said TFF for refracting the input optical beam from the filter area to the reflection area, while the rotating mirror is being rotated.

14. The TOADM according to claim 1, further comprising a first circulator optically coupled to the input/output port having an input port for inputting the input optical beam and an output port for outputting the reflected beam.

15. The TOADM according to claim 2, further comprising a second circulator optically coupled to the add/drop port having an input port for inputting the add beam and an output port for outputting the transmitted beam.

* * * * *